(12) United States Patent
Jain et al.

(10) Patent No.: US 8,526,784 B2
(45) Date of Patent: Sep. 3, 2013

(54) DIGITAL VIDEO RECORDER COLLABORATION AND SIMILAR MEDIA SEGMENT DETERMINATION

(75) Inventors: Mukul Jain, San Jose, CA (US); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1427 days.

(21) Appl. No.: 11/829,605

(22) Filed: Jul. 27, 2007

(65) Prior Publication Data

US 2009/0028520 A1 Jan. 29, 2009

(51) Int. Cl.
H04N 9/80 (2006.01)

(52) U.S. Cl.
USPC ........... 386/241; 386/239; 386/249; 386/250; 386/251; 386/262

(58) Field of Classification Search
USPC .......... 386/241, 248–251, 291–299, 343–352
See application file for complete search history.

(56) References Cited

U.S. PATENT DOCUMENTS

| | | | |
|---|---|---|---|
| 2001/0039656 A1* | 11/2001 | Nakamura et al. | 725/9 |
| 2002/0120925 A1* | 8/2002 | Logan | 725/9 |
| 2004/0091236 A1* | 5/2004 | Boston et al. | 386/46 |
| 2004/0189873 A1 | 9/2004 | Konig et al. | |
| 2004/0190853 A1 | 9/2004 | Dow et al. | |
| 2005/0086188 A1* | 4/2005 | Hillis et al. | 706/50 |
| 2005/0163481 A1* | 7/2005 | Hirai | 386/69 |
| 2007/0156636 A1* | 7/2007 | Norton et al. | 707/1 |
| 2007/0280633 A1* | 12/2007 | Nakamura et al. | 386/68 |
| 2007/0280636 A1* | 12/2007 | Adachi | 386/83 |
| 2007/0286579 A1* | 12/2007 | Murabayashi et al. | 386/96 |

FOREIGN PATENT DOCUMENTS

| | | |
|---|---|---|
| CN | 101766024 | 6/2010 |
| EP | 2172010 | 4/2010 |
| WO | WO 2006/016590 A1 * | 2/2006 |
| WO | WO 2009/017995 | 2/2009 |

OTHER PUBLICATIONS

PCT International Search Report mailed May 12, 2008 for PCT/US2008/070585; 4 pages.
PCT International Preliminary Report on Patentability and Written Opinion of the International Searching Authority mailed Feb. 2, 2010 for PCT/US2008/070585; 7 pages.
PRC 2012-2-15 SIPO of People's Republic of China First Office Action from Chinese Patent Application 200880100566.4; 12 pages.
EPO Dec. 1, 2012 Response to EPO Communication dated Aug. 9, 2011 from EP Application No. 08782118.7; 12 pages.

(Continued)

Primary Examiner — Thai Tran
(74) Attorney, Agent, or Firm — Patent Capital Group (57) ABSTRACT

In one embodiment, a method for performing actions with media information using a digital video recorder is provided. In one embodiment, a user may mark a media segment in media using a digital video recorder. Characteristics for the media segment are then determined. A second media segment in second media may then be determined. For example, the second media segment may have similar characteristics to the first media segment. In one example, an advertisement that is similar to the advertisement marked as the first media segment may be determined. An action may then be performed with the second media segment. For example, the second media segment may be removed from the second media.

21 Claims, 6 Drawing Sheets

(56) References Cited

OTHER PUBLICATIONS

PRC Apr. 8, 2011 SIPO of People's Republic of China First Office Action from Chinese Patent Application 200880100566.4 [English translation only available]; 4 pages, Apr. 8, 2011.

Aug. 22, 2011 Response to SIPO First Office Action from Chinese Patent Application 200880100566.4, Apr. 8, 2011.

Sep. 8, 2011 EPO Communication from EP Application No. 08782118.7, Aug. 9, 2011.

Dimitrova, N., et a., "Applications of Video-Content Analysis and Retrieval," IEEE Multimedia, IEEE Service Center, vol. 9, No. 3, Jul. 1, 2002; pp. 42-55 http://www-video.eecs.berkeley.edu/papers/Dimitrove/IEEE_MM2002.pdf.

Kim, Hyea Kyeong, et al., "A Collaborative Filtering Recommendation Methodology for Peer-to-Peer Systems," E-Commerce and Web Technologies Lecture Notes in Computer Science; vol. 3590, Jan. 1, 2005; pp. 98-107.

Lin, Ching-Yung, et al., "Video Collaborative Annotation Forum: Establishing Ground-Truth Labels on Large Multimedia Datasets," Trecvic Workshop; Nov. 18, 2003, 19 pages http://www.itl.nist.gov/iaui/894.02/projects/tvpubs/tvpapers03/ibm.final2.paper.pdf.

Satterwhite, Brandon, et al., "Automatic Detection of TV Commercials," IIE Potentials, May 31, 2004; 4 pages http://www.cse.unr.edu/~bebis/CS474/StudentPaperPresentations/DetectionTVCommercials.pdf.

Weidong, Fang, et al., "Addressing Interest Diversity in P2P Based Collaborative Spam Filtering," Grid and Cooperative Computing Workshops, GCCW 006 Fifth International Conference IEEE; Oct. 1, 2006; pp. 163-169.

PRC Jan. 17, 2013 Response to SIPO of People's Republic of China Third Office Action from Chinese Patent Application 200880100566.4; English Translation of Claims only [This is the 3rd Office Action, but has been translated as "Second Office Action"].

"Digital Video Recorder" Stand Alone PC Based DVR—Time Lapse VCR & A . . . ; Allthings Sales & Services, Recording Equipment Menu (http://www.allthings.com.au/vcr/index.html), 2 pages. 2007.

ClickView, ClickView Library Server, ClickView Library Manager, Article ID: 0035, Last Review Jun. 15, 2007 (http://www.clickview.com.au/support/view_knowledge.php?knowledge_id=35), 7 pages. 2003-2007.

Evolution TV—Another Mac PVR / PVRblog (http://www.pvrblog.com/pvr/2005/03/evolutiontv_ano.html), 3 pages. 2005.

Apple—Final Cut Studio 2—Final Cut Pro 6 (http://www.apple.com/finalcutstudio/finalcutpro/), 2 pages. 2007.

TVEyes, Broadcast Intelligence by TVEyes (http://tvyes.com/), 2 pages. 1999-2000.

Everyzing (http://www.everyzing.com/ and http://podzinger.com), 1 page. 2007.

Video Search Engine—Blinkx (http://www.blinkx.com/), 1 page. 2007.

R. Fisher, S. Perkins, A. Walker and E. Wolfart, Fourier Transform (from Image Transforms), Copyright 2003, 10 pages.

PRC Apr. 27, 2012 Response to SIPO of People's Republic of China Second Office Action from Chinese Patent Application 200880100566.4; (English translation of pending claims only); 11 pages, Apr. 27, 2012.

PRC Nov. 5, 2012 SIPO of People's Republic of China Third Office Action from Chinese Patent Application 200880100566.4; 11 pages [This is the 3$^{rd}$ Office Action, but has been translated as "Second Office Action"] Nov. 5th, 2012.

\* cited by examiner

DIGITAL VIDEO RECORDER COLLABORATION AND SIMILAR MEDIA SEGMENT DETERMINATION

TECHNICAL FIELD

Particular embodiments generally relate to media processing.

BACKGROUND

Digital video recorders (DVRs) are being used by many users. A service is provided where users can automatically record videos, such as TV shows, movies, or any other media, using their DVR. The DVRs provide enhancements for shifting the viewing time to a time that is preferred by viewers. For example, viewers may fast forward the media to a point that is desired. However, the process for shifting the viewing time is tedious and time-consuming. For example, while a user is watching different television shows, the user may have to fast forward the media multiple times. The user may have to manually start the fast forwarding and then manually stop the fast forwarding at the right time to continue watching the show.

DESCRIPTION OF EXAMPLE EMBODIMENTS

Overview

In one embodiment, a method for performing actions with media information using a digital video recorder is provided. In one embodiment, a user may mark a media segment in media using a digital video recorder. For example, a user may mark the beginning and end of a section in a video, such as an advertisement. Characteristics for the media segment are then determined. A second media segment in second media may then be determined. For example, the second media segment may have similar characteristics to the first media segment. In one example, an advertisement that is similar to the advertisement marked as the first media segment may be determined. An action may then be performed with the second media segment. For example, the second media segment may be removed from the second media. In one example, advertisements that have been marked in the first media may automatically be removed from the second media. Thus, the user does not have to continually fast forward over advertisements that have been deemed undesirable. Other actions may also be performed, which will be described in more detail below.

Example Embodiments

Figure 1:
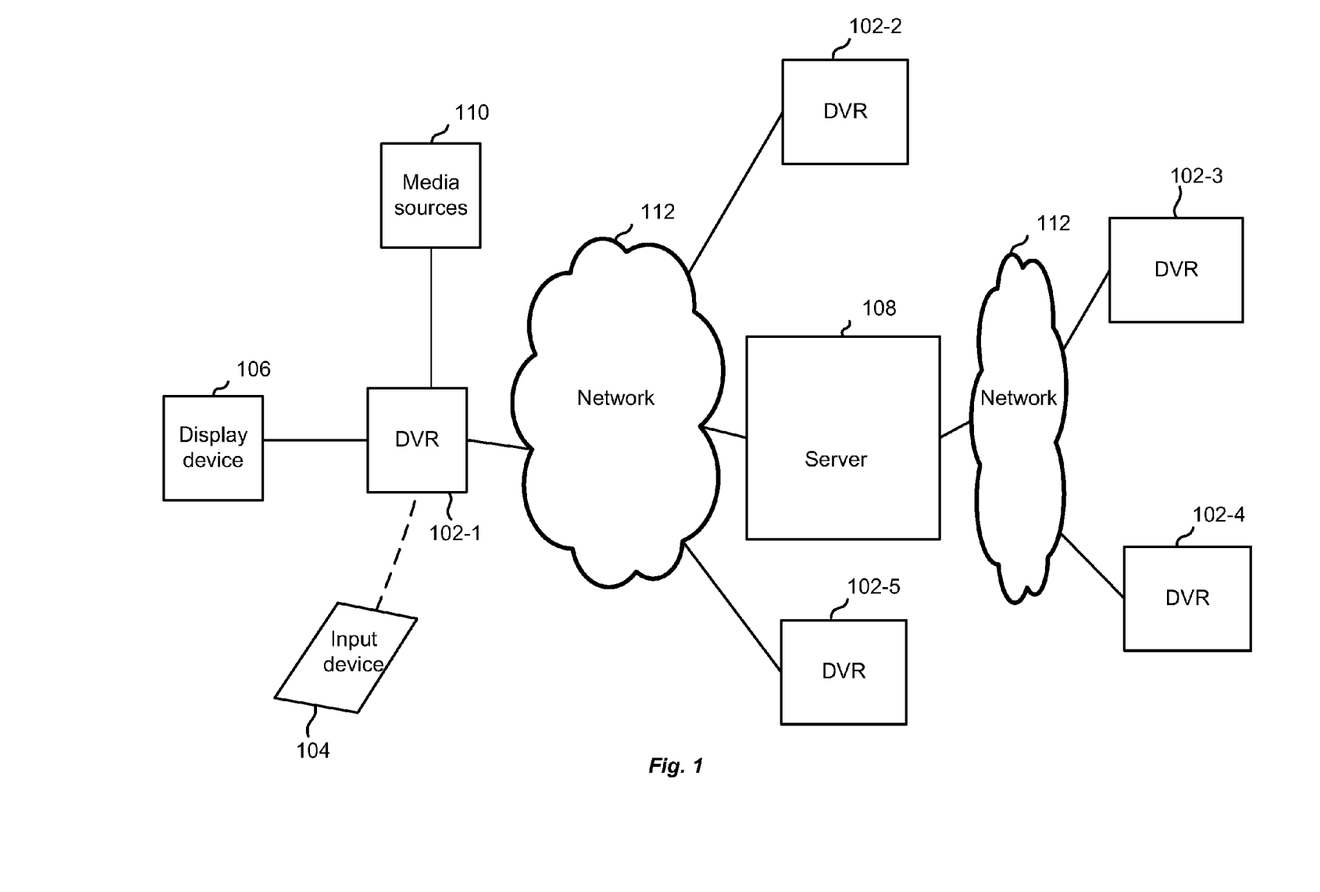
FIG. 1 depicts an example of a system for processing media.

FIG. 1 depicts an example of a system for processing media. As shown, a primary DVR 102-1 may be operated by a user using input device 104. DVR 102-1 may receive media from media sources 110. For example, the media may include video, audio, data, Internet website material, video-on-demand, streaming video, webcasts, etc. Also, the media sources 110 may include a cable operator, satellite provider, Internet website, or any other service provider. Further, media sources 110 may be tangible media, such as digital video disks (DVDs), compact disks (CDs), etc.

DVR 102 may be any device capable of recording media. For example, DVR 102 may include digital video recorders, video recording servers, personal computers with video recording capability, media personal computers (PCs), or other recording devices. DVR 102 records media that may be received from media sources. The media may be recorded as specified by the user. For example, the user may specify which media should be recorded. In one example, different TV shows, movies, etc., may be recorded.

Media may be any information that is received by DVR 102 from media sources. DVR 102 may record the media and store it in storage, which may be local to DVR 102 or distributed among other storage devices. Also, DVR 102 may facilitate displaying the media on a display device 106, which may be a television, monitor, portable video player, or any other display device.

Input device 104 may be a remote control, keyboard, or any other input device. Input device 104 may be used to control DVR 102. For example, input device 104 may be used to time shift media. That is, a user may fast forward, rewind, or perform other time shifting operations with media. In yet another example embodiment the input may be a voice activated device which utilizes adaptive speech recognition or a natural language recognition.

Portions of the media can be marked by a user. For example, a segment of media may be marked using input device 104. Various input methods may be used, such as a user may select a start button at the beginning of a media segment and an end button at the end of the media segment to identify the media segment. Particular embodiments can then determine other media segments that may be related to this media segment. For example, characteristics of the marked media segment may be determined. The characteristics may be used to identify other media segments that include similar characteristics. For example, when an advertisement is marked, the characteristics of the advertisement are used to find other instances of the advertisement, such as instances found later in the media or in other media. DVR 102 may then perform an action with the identified media segments. For example, the identified media segments may be removed. Thus, if a user marks an ad, other instances of the ad may be removed. Although removal is contemplated, other actions, such as fast forwarding, may also be appreciated.

A community of users or a social network may also be formed. For example, users of DVRs 102-2, 102-3, 102-4, and 102-5 may be connected to a user of DVR 102-1 in the social network. Connected users may then share information. The term "user" and "DVR" may refer to the connection between the users and their equipment. For example, a user may have his/her own DVR in his/her home or may be assigned a DVR by a service provider.

When a user of DVR 102-1 marks a media segment for removal, information for the media segment may be communicated to DVRs 102-2-102-5 over a network 112. Network 112 may be an Internet Protocol (IP) network, local area network (LAN), wide area network (WAN), etc. DVRs 102-2-102-5 may then determine an action to perform. For example, the same media segments in media stored at DVRs 102-2-102-5 may also be removed. The removal may be based on different rules that may be configured, which will be discussed in further detail below.

DVR 102-1 may communicate with DVRs 102-2-102-5 through different methods. For example, an intermediate device, such as a server 108, may be used to communicate with DVRs 102-3 and 102-4. Also, peer-to-peer communication may be provided where DVR 102-1 communicates with DVR 102-2 and 102-5 over network 112. If server 108 is used, a central database may be provided where information on media segments marked by DVR 102-1 may be stored at server 108. DVRs 102-2, 102-3 and 102-4 may then access the database and determine any actions to perform based on the stored information.

Figure 2:
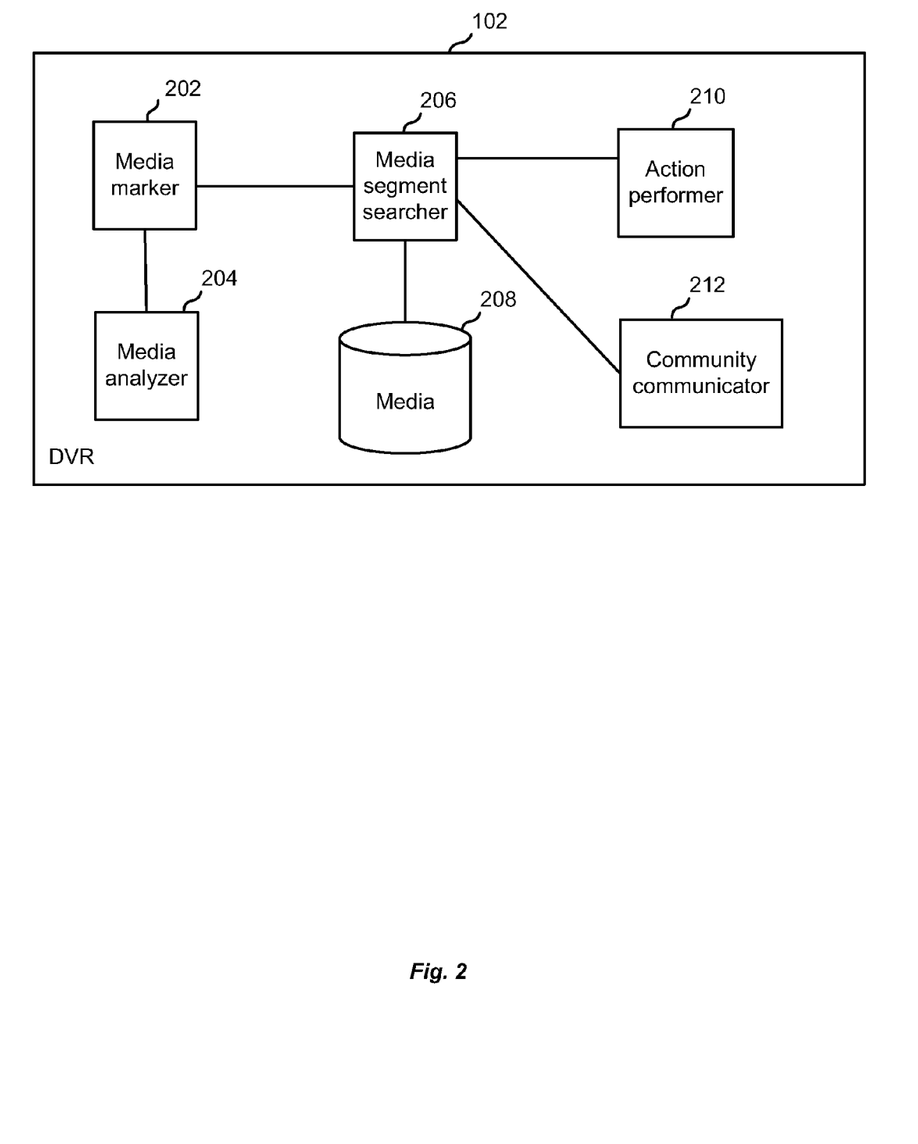
FIG. 2 depicts a more detailed example of a DVR.

FIG. 2 depicts a more detailed example of DVR 102. As shown, DVR 102 includes a media marker 202, a media analyzer 204, a media segment searcher 206, storage 208, an action performer 210, and a community communicator 212.

Media marker 202 receives information for marking media. For example, input device 104 may be used to mark a segment of the media. Also, any media editor may be used, such as an application on a personal computer, etc. Media marker 202 may store information that identifies the media segment. For example, a start time and an end time in the media may be stored. The marked media segment may be repeated in numerous recordings, such as a television advertisement. In one example embodiment, extensible markup language (XML) tags can be used to mark specific media segments.

Media analyzer 204 may determine characteristics of the marked media segment. In one example, the characteristics for the marked media segment may be determined in real time when the media segment is marked. The characteristics may be voice and/or video signatures. In one example, a frequency spectrum of the video signature is based on a two-dimensional Fourier transform. Other methods for determining characteristics of media, such as pattern recognition, may be employed.

Media segment searcher 206 is configured to determine other media segments of media stored on storage 208 using the characteristics for the marked media segment. For example, media segments in storage 208 that include similar characteristics to the characteristics of the marked media segment may be determined. These may be considered potential related media segments. For example, the potential related media segments may be similar advertisements to the one marked.

To determine potential related media segments, characteristics of media in storage 208 may have been analyzed previously. This may make the searching process faster. For example, voice and video signatures may be determined from all media stored in storage 208. In one example embodiment the system attaches a media tag that indicates the source of the recording and the time it has been recorded. For example, the tag may indicate that a specific media clip was recorded from channel 5 at 11:35 PM. Using DVR 102, users may select different media to be recorded at different times. After recording, media analyzer 208 may determine characteristics of the media. The characteristics of the marked media segment and the actual media may be stored in storage 208. For example, various television shows, movies, etc. may have been recorded and stored in storage 208, such as a hard drive of DVR 102. Characteristics of the media may be associated with the media. For example, the characteristics may be stored with the media, indexed to the media, etc.

Action performer 210 then determines an action to perform with the potential related media segments. For example, the potential related media segments may be manipulated in media in storage 208. In one embodiment, action performer 210 displays potential related media segments to the user and asks for authorization for performing an action. For example, action performer 210 may prompt the user to okay skipping of the potential related media segments. The skipping may be removal of the segment from the media, logic that automatically skips the segment when it is encountered during playback, etc. Action performer 210 may remove the potential related media segments from the media. For example, a first TV show may include an advertisement for a beer. A second television show may also include a second advertisement for the beer that may be the same advertisement, a similar advertisement by the same brand, a similar advertisement in the same genre, etc. The second advertisement may also be an unrelated advertisement but a rule may be used to determine the second advertisement based on the characteristics of the marked media segment. For example, marking of a beer ad may cause removal of ads for soft drinks (possibly because they are both drink related).

In one embodiment, action performer 210 may remove the potential related media segments from the second TV show. Although the media segments may be removed, other actions may be taken. For example, in another embodiment, action performer 210 may mark the beginning and end of a potential related media segment in the media. When DVR 102 then encounters the potential related media segment during playback, skipping of the potential related media segment may be provided. For example, the user may decide to skip the segment using a "fast forward", "skip" or "next segment" command on input device 104. In yet another embodiment, action performer 210 may insert logic that automatically skips the potential related media segment when it is encountered during playback. For example, DVR 102 may automatically start fast forwarding the media during the related media segment.

Potential related media segments may be determined at any time. For example, once a user marks a segment as being undesirable, DVR 102 may determine other potential related media segments and perform the appropriate actions, such as removing the advertisements from other media. In another embodiment, DVR 102 may analyze the characteristics in real time as media is playing and/or being recorded and then takes the appropriate actions, such as removing the potential related media segments.

Figure 3:
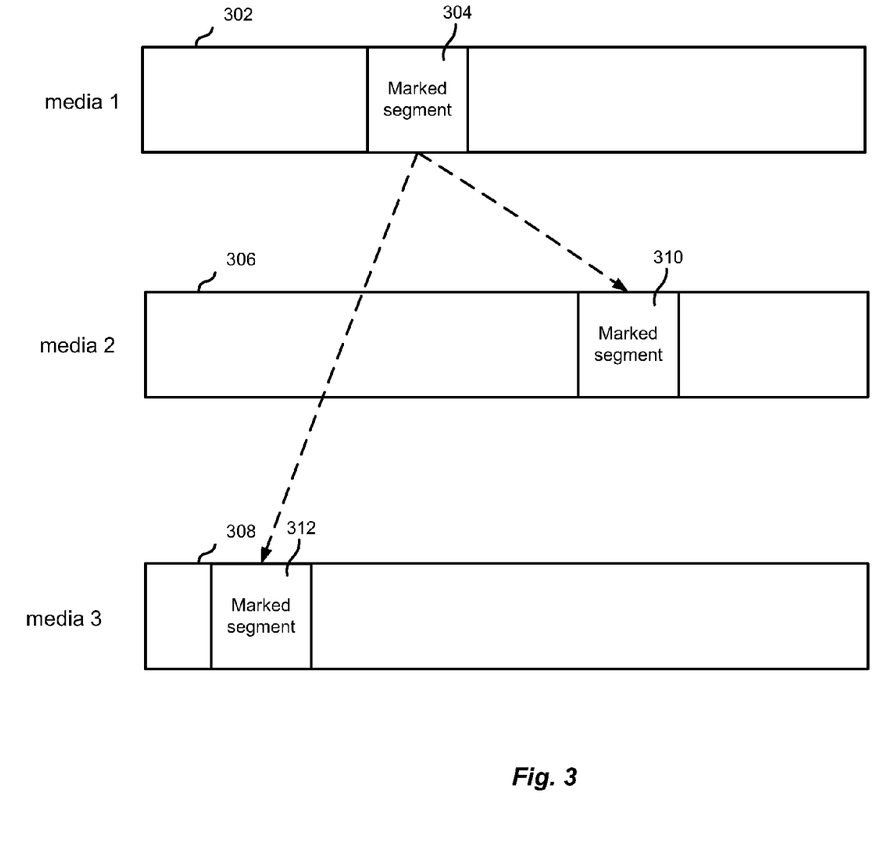
FIG. 3 shows an example of a media that include similar media segments.

FIG. 3 shows an example of a media that include similar media segments. As shown, first media 302 has a marked media segment 304. Second media 306 and third media 308 are also provided. Second media 306 may include a media segment 310 and third media 308 may include a media segment 312. Media segments 310 and 312 may be found at different points in second media 306 and third media 308. Media segment searcher 206 is configured to search characteristics of second media 306 and third media 308 to determine segments that have similar characteristics to marked media segment 304. Thus, media segments in different media may be determined based on marked media segment 304. For example, first media 302 is a first television show in a series, second media 306 may be a second television show in the series, and third media 308 is the third show in the series.

Figure 4:
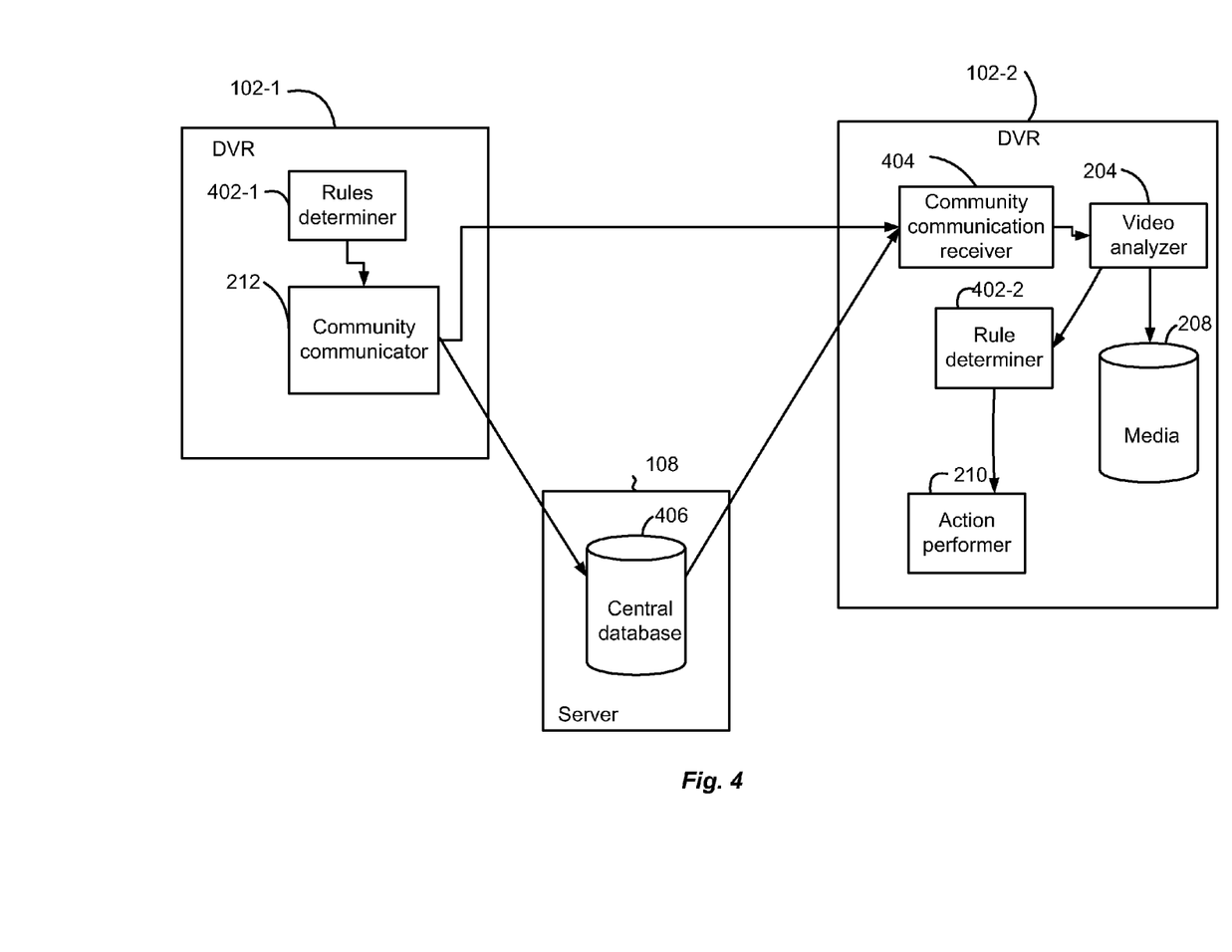
FIG. 4 depicts an example of a method for communicating between users in the social network.

As discussed above, a social network may be provided. FIG. 4 depicts an example of a method for communicating between users in the social network. DVR 102-1 includes a rules determiner 402-1 and a community communicator 212. In one embodiment, a trust may be established amongst similar-minded people that form the social network. This trust may be translated into a willingness to share information amongst the social network. For example, information may be shared about the marking of media segments, such as the characteristics of marked media segments.

Rules determiner 402-1 determines users in which information should be shared. For example, all users that may be connected to the user of DVR 102-1 may be selected to receive information. Also, in another example embodiment only users that are in a friends list, first degree friends, second degree friends, etc. may be selected.

Community communicator 212 enforces and facilitates communication amongst users of a specific social network. For example, the information may be communicated to a DVR 102-2. A community communication receiver 404 receives the information, such as the characteristics for a marked media segment.

A rules determiner 402-2 determines rules to apply to the received information. Rules that may be applied include determining if an action should be taken. Even though the characteristics have been received because the user of DVR 102-1 sent them to DVR 102-2, a second user of DVR 102-2 may or may not want to have an action taken based on the characteristics. For example, depending on the second user's trust of the first user, an action may or may not be taken. In one example, a second user may trust the first user's decisions in marking media and thus may automatically determine that similar media should be removed. However, the first user may not have built up enough trust with the second user and thus the media segments may not be automatically removed but may be marked and shown to the second user for their approval for deletion. Also, a number of users may need to mark a media segment for removal before any action is taken. In one example, if only one user decided to remove the media segment, there might not be enough trust to have the segment automatically removed. However, if the media segment has been removed by multiple users, such as ten users, then the rules may specify that the media segment should be automatically removed.

In one embodiment, rules may also apply to the social network as a whole. For example, the rules may determine which users can alter the viewing policy of the social network and which users can subscribe to the network and thus leverage the social network's viewing policies. In one example, some users may be able to mark media segments for removal in media for all members of the social network. Also, users may mark how important a media segment is, such as a segment may be high priority or low priority. A high priority segment may be a segment that a user is recommending to another user. A recommendation is then sent to other members of the social network.

Also, some members may be designated as non-marking members that can only use the viewing policies. Other rules may also be applied.

An action performer 210 then performs the action. For example, the media segments may be removed as described above in FIG. 2, marked for skipping, etc.

The sharing may be done peer-to-peer. However, another embodiment may use a central database 406, which may be included in server 108. Although a single database 406 is described, it will be understood that the database may be distributed, such as the database may be distributed in multiple storage devices attached to the network. Also, the storage may be distributed in multiple DVRs 102.

In one embodiment, community communicator 212 may communicate the characteristics for media segments that have been marked to database 406. Other DVRs 102 may also access database 406 for updates.

One example for using particular embodiments will now be described. A first user may identify an advertisement and mark it accordingly. The information for the advertisement is then made available to all the users in the first user's social network. In a small group with high trust, a marking by one person may cause advertisements similar to the one identified not to be played by DVRs for users in the social network. For larger social networks, other actions may be needed to cause skipping of an advertisement. For example, if fewer than 100 users approve the skipping of an advertisement, the advertisement will still be played but users may have the option of accepting this skipping by marking the advertisement as undesirable or rejecting the skipping. Once a threshold of users have been reached that have marked the advertisement for skipping, then the advertisement may be automatically skipped during playing of media for users in the social network. In another embodiment, if the system detects that there are conflicts when one user marks a media segment for removal but others desire to keep it in, then the system may suggest that the social network be split into separate groups who seem to have different tastes.

Figure 5:
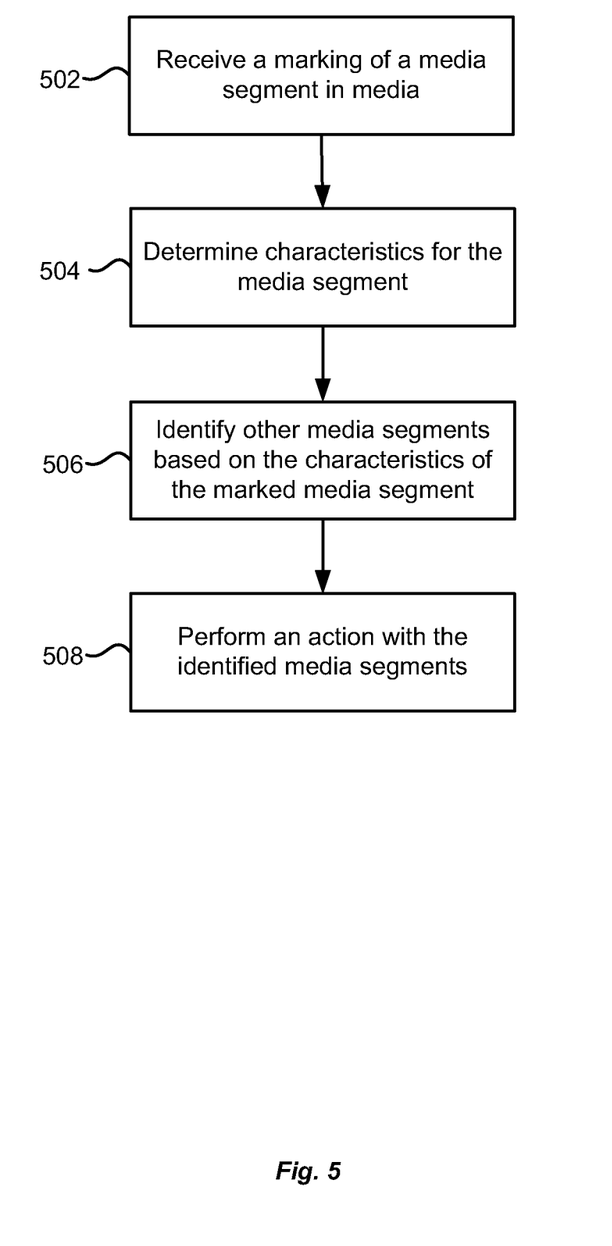
FIG. 5 depicts a simplified flow chart of a method for performing actions with media.

FIG. 5 depicts a simplified flow chart of a method for performing actions with media. Step 502 receives a marking of a media segment in media. For example, an advertisement may be marked at specific times in media.

Step 504 determines characteristics for the media segment. For example, a voice or video signature of the media segment may be determined.

Step 506 identifies other media segments based on the characteristics of the marked media segment. For example, other media segments with characteristics similar to the characteristics of the marked media segment may be determined. In one embodiment, these may be the same ads that may appear frequently in different media.

Step 508 then performs an action with the identified media segments. For example, they may be marked for removal or skipping.

Figure 6:
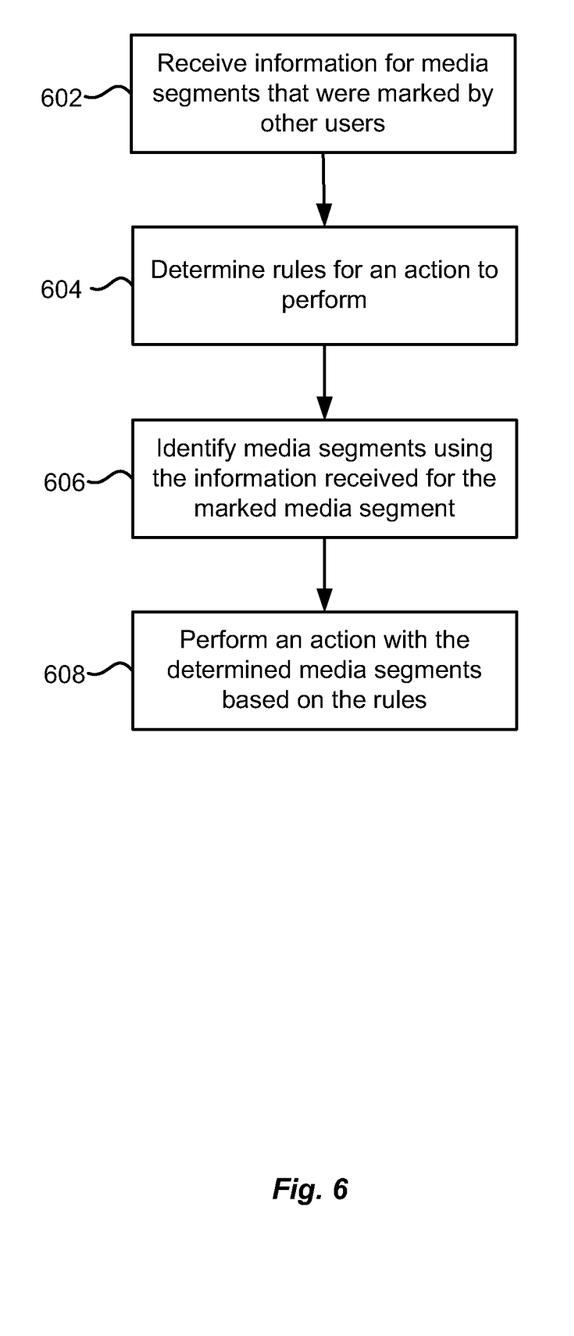
FIG. 6 depicts an example of a method for determining what actions to perform based on segments marked by other users.

FIG. 6 depicts an example of a method for determining what actions to perform based on segments marked by other users. Step 602 receives information for media segments that were marked by other users. For example, the characteristics for a marked media segment may be received.

Step 604 determines rules for an action to perform. For example, the rules may determine how trusted the other users are. It may then be determined whether or not an action should be performed with similar media segments.

Step 606 identifies media segments using the information received for the marked media segment. For example, media segments that include similar characteristics to the marked media segment may be determined.

Step 608 then performs an action with the determined media segments based on the rules. For example, these media segments may be marked for removal or skipping during playback.

Particular embodiments provide many advantages. For example, an automated method for marking undesirable media segments for removal is provided. This reduces time a user needs to spend to fast forward past undesirable media segments that may be repeated across multiple media. Further, a social network is provided where information may be shared to allow actions to be performed based on marked media segments. For example, other users may have the media segments removed based on actions of other users. The information may be shared based on recommendations and trust of other users. Accordingly, the social network provides an efficient method to remove undesirable media segments. Also, the social network may be used to determine which media segments may be undesirable. For example, if advertisements are consistently skipped, then information may be sent to the advertiser indicating the advertisement's undesirableness. However, other advertisements may not be skipped and it may be determined that this advertisement is desirable. Advertisers may then decide to show the more desirable advertisement instead of the undesirable advertisement.

Although the description has been described with respect to particular embodiments thereof, these particular embodiments are merely illustrative, and not restrictive. Although advertisements are described, it will be understood that any media may be used. Further, any actions may be taken based on the characteristics of a marked media segment.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:
   identifying a marking of a first portion of first media by a user, wherein the marking of the first portion of the first media indicates that the first portion of the first media should be omitted in subsequent playbacks of stored media;
   determining, using at least one processor device, that the marking is a trusted marking to be applied to media stored on both a corresponding digital video recorder of the user and digital video recorders of other users;
   determining, using at least one processor device, characteristics of the first portion of the first media based, at least in part, on the marking of the first portion of the first media by the user;
   identifying a commonality between the first portion of the first media and a particular portion of second media stored on a particular one of the digital video recorders of the other users based, at least in part, on the determined characteristics of the first portion of the first media, wherein the second media is different from the first media and the particular portion of the second media is less than all of the second media; and
   causing the particular portion of the second media to be omitted from playback of the second media from the particular digital video recorder based on the marking.

2. The method of claim 1, wherein the omitting playback of the particular portion includes causing the particular portion of the second media to be skipped when played back from the particular digital video recorder.

3. The method of claim 2, wherein skipping the particular portion of media comprises providing logic to skip the particular portion of the second media during playback of the second media.

4. The method of claim 1, wherein determining the characteristics of the first portion of the first media comprises analyzing a voice or video signature of the first portion of the first media.

5. The method of claim 1, further comprising communicating the characteristics of the first portion of the first media to a second digital video recorder, wherein the communicated characteristics allow the second digital video recorder to:
   identify a commonality between the first portion of the first media and at least a portion of third media stored on the second digital video recorder based, at least in part, on the communicated characteristics of the first portion of the first media, wherein the third media is different from the first media; and
   causing the identified portion of the third media to be omitted from playback of the third media from the second digital video recorder based on the marking.

6. The method of claim 1, further comprising:
   determining a social network of users related to a particular user of the particular digital video recorder; and
   sharing the determined characteristics for the first portion of the first media and the marking indicating omission of the first portion with one or more users in the social network to cause other media portions determined to possess commonalities with the first portion of the first media and stored on digital video recorders to be omitted during playback of associated media including the other media portions.

7. The method of claim 6, further comprising:
   receiving, from the user, an indication of an importance of the first portion of the first media; and
   sending a recommendation based on the importance to other members of the social network.

8. The method of claim 1, wherein the characteristics of the first portion of the first media are determined based on markings of the first portion of the first media by a plurality of users.

9. The method of claim 1, wherein causing the particular portion of the second media to be omitted from playback of the second media from the particular digital video recorder includes:
   inserting logic configured to manipulate the second media including the particular portion of the second media;
   storing the logic in association with the second media including the particular portion of the second media;
   playing back the second media including the particular portion of the second media; and
   executing the logic to manipulate the second media during playback.

10. The method of claim 1, further comprising receiving the characteristics from a second digital video recorder for a second user different from the first user who marked the first portion of the first media.

11. The method of claim 1, wherein causing the particular portion of the second media to be omitted from playback includes removing the particular portion of second media from the second media stored on the particular digital recorder.

12. The method of claim 1, wherein determining that the marking is untrusted causes the marking to only be applied to the digital video recorder of the user.

13. The method of claim 12, wherein determining whether the marking is trusted includes determining a correlation between the marking and markings by other users of other media portions for omission that share commonalities with the first media portion.

14. The method of claim 1, wherein the second media is recorded to the particular digital video recorder subsequent to the marking and the commonality is identified during recording of the second media to the particular digital video recorder.

15. The method of claim 1, wherein the second media is recorded to the particular digital video recorder prior to the marking and the commonality is identified during a scan of media stored on the particular digital video recorder.

16. An apparatus comprising:
    one or more processors; and
    logic encoded in one or more tangible media for execution by the one or more processors and when executed operable to:
       identify a marking of a first portion of first media by a user, wherein the marking of the first portion of the first media indicates that the first portion of the first media should be omitted in subsequent playbacks of stored media;
       determine that the marking is a trusted marking to be applied to media stored on both a corresponding digital video recorder of the user and digital video recorders of other users;
       determine characteristics of the first portion of the first media based, at least in part, on the marking of the first portion of the first media by the user;

identify a commonality between the first portion of the first media and a particular portion of second media stored on a particular one of the digital video recorders of the other users based, at least in part, on the determined characteristics of the first portion of the first media, wherein the second media is different from the first media and the particular portion of the second media is less than all of second media; and cause the particular portion of the second media to be omitted from playback of the second media from the particular digital video recorder based on the marking.

17. The apparatus of claim 16, wherein causing the particular portion of the second media to be omitted from playback includes removing causing the particular portion of the second media to be fast-forwarded when played back from the particular digital video recorder.

18. The apparatus of claim 17, wherein causing the particular portion of the second media to be omitted from playback includes removing the particular portion of second media from the stored second media.

19. The apparatus of claim 16, wherein the logic when executed is further operable to communicate the characteristics of the first portion of the first media to a second digital video recorder, wherein the communicated characteristics allow the second digital video recorder to:

identify a commonality between the first portion of the first media and at least a portion of third media stored on the second digital video recorder based, at least in part, on the communicated characteristics of the first portion of the first media, wherein the third media is different from the first media; and causing the identified portion of the third media to be omitted from playback of the third media from the second digital video recorder based on the marking.

20. The apparatus of claim 16, wherein the logic when executed is further operable to:

determine a social network of users related to a user of the particular digital video recorder; and sharing the determined characteristics for the first portion of the first media and the marking indicating omission of the first portion with one or more other users in the social network to cause other media portions determined to possess commonalities with the first portion of the first media and stored on digital video recorders associated with the one or more other users to be omitted during playback of associated media including the other media portions.

21. Logic encoded in non-transitory media that includes code for execution and when executed by a processor is operable to perform operations comprising:

identifying a marking of a first portion of first media by a user, wherein the marking of the first portion of the first media indicates that the first portion of the first media should be omitted in subsequent playbacks of stored media;

determining, using at least one processor device, that the marking is a trusted marking to be applied to media stored on both a corresponding digital video recorder of the user and digital video recorders of other users;

determining, using at least one processor device, characteristics of the first portion of the first media based, at least in part, on the marking of the first portion of the first media by the user;

identifying a commonality between the first portion of the first media and a particular portion of second media stored on a particular one of the digital video recorders of the other users based, at least in part, on the determined characteristics of the first portion of the first media, wherein the second media is different from the first media and the particular portion of the second media is less than all of second media; and causing the particular portion of the second media to be omitted from playback of the second media from the particular digital video recorder based on the marking.

* * * * *